United States Patent
Edamoto et al.

(10) Patent No.: US 11,440,577 B2
(45) Date of Patent: Sep. 13, 2022

(54) STEERING SYSTEM, ABNORMALITY DETERMINATION METHOD, AND NON-TRANSITORY STORAGE MEDIUM

(71) Applicant: JTEKT CORPORATION, Osaka (JP)

(72) Inventors: Syouma Edamoto, Ikoma (JP); Takeshi Watanabe, Kashihara (JP); So Saito, Kashiwara (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 17/356,706

(22) Filed: Jun. 24, 2021

(65) Prior Publication Data

US 2021/0403076 A1 Dec. 30, 2021

(30) Foreign Application Priority Data

Jun. 25, 2020 (JP) ............................. JP2020-109989

(51) Int. Cl.
*B62D 1/187* (2006.01)
*B62D 1/181* (2006.01)

(52) U.S. Cl.
CPC ............. *B62D 1/187* (2013.01); *B62D 1/181* (2013.01)

(58) Field of Classification Search
CPC ......... B62D 1/187; B62D 1/181; B62D 1/183
See application file for complete search history.

(56) References Cited

U.S. PATENT DOCUMENTS

| 2017/0334452 A1 | 11/2017 | Abe et al. |
| 2018/0201294 A1* | 7/2018 | Makimura ............. H02K 11/20 |
| 2019/0308655 A1 | 10/2019 | Ochi et al. |
| 2021/0213997 A1* | 7/2021 | Watanabe ............... G01L 5/221 |
| 2021/0316782 A1* | 10/2021 | Lee ....................... B62D 5/0493 |

FOREIGN PATENT DOCUMENTS

| CN | 109823389 A | 5/2019 | |
| EP | 3929060 A1 * | 12/2021 | ............. B62D 1/181 |
| JP | 2007-106181 A | 4/2007 | |
| JP | 2017-206153 A | 11/2017 | |
| JP | 2019130935 A * | 8/2019 | ............. B60W 10/20 |
| WO | WO-2019175292 A1 * | 9/2019 | ............. B60N 2/002 |
| WO | WO-2021170199 A1 * | 9/2021 | |

OTHER PUBLICATIONS

Nov. 24, 2021 Search Report issued in European Patent Application No. 21181386.0.

* cited by examiner

*Primary Examiner* — Drew J Brown
(74) *Attorney, Agent, or Firm* — Oliff PLC

(57) ABSTRACT

A steering system includes a first operation device including a first displacement mechanism, a first electric drive source, and a first detector, a second operation device including a second displacement mechanism, a second electric drive source, and a second detector, and a determiner configured to determine that the first operation device and the second operation device do not malfunction when the determiner determines that the first operation device has an abnormality based on first operation information related to operation of the first operation device, and that the second operation device has an abnormality based on second operation information related to operation of the second operation device.

11 Claims, 7 Drawing Sheets

STEERING SYSTEM, ABNORMALITY DETERMINATION METHOD, AND NON-TRANSITORY STORAGE MEDIUM

CROSS-REFERENCE TO RELATED APPLICATION

This application claims priority to Japanese Patent Application No. 2020-109989 filed on Jun. 25, 2020, incorporated herein by reference in its entirety.

BACKGROUND

1. Technical Field

The present disclosure relates to a steering system configured to electrically change a position of an operation member, an abnormality determination method, and a non-transitory storage medium.

2. Description of Related Art

In autonomous vehicle driving at or above Level 3 at which a system has all responsibility, a driver need not have responsibility for operation of the vehicle, and need not even hold an operation member such as a steering wheel. If the steering wheel moves during the autonomous driving to secure a wide space in front of the driver, the driver's comfort level can be increased. There is a proposal for a technology for moving the steering wheel to a retraction area on a front side of the vehicle during the autonomous driving (see, for example, Japanese Unexamined Patent Application Publication No. 2017-206153 (JP 2017-206153 A)).

SUMMARY

In a case where the operation member is moved by an electric motor, an abnormality may occur in a sensor configured to acquire a position of the operation member, or in a mechanism configured to operate the operation member. Further, the driver or the like may interfere with the operation member while the operation member is operating by the electric motor.

The present disclosure achieves discrimination of the types of abnormality based on, for example, existing sensors.

A first aspect of the present disclosure relates to a steering system. The steering system includes a first operation device, a second operation device, and a determiner. The first operation device includes a first displacement mechanism, a first electric drive source, and a first detector. The first displacement mechanism is configured to change a position of an operation member to be operated by a driver. The first electric drive source is configured to operate the first displacement mechanism. The first detector is configured to detect first positional information indicating the position of the operation member based on the first displacement mechanism. The second operation device includes a second displacement mechanism, a second electric drive source, and a second detector. The second displacement mechanism is different from the first displacement mechanism. The second electric drive source is configured to operate the second displacement mechanism. The second detector is configured to detect second positional information indicating the position of the operation member based on the second displacement mechanism. The determiner is configured to determine that the first operation device and the second operation device do not malfunction when the determiner determines that the first operation device has an abnormality based on first operation information related to operation of the first operation device, and that the second operation device has an abnormality based on second operation information related to operation of the second operation device.

A second aspect of the present disclosure relates to an abnormality determination method for a steering system. The steering system includes a first operation device, a second operation device, and a determiner. The first operation device includes a first displacement mechanism, a first electric drive source, and a first detector. The first displacement mechanism is configured to change a position of an operation member to be operated by a driver. The first electric drive source is configured to operate the first displacement mechanism. The first detector is configured to detect first positional information indicating the position of the operation member based on the first displacement mechanism. The second operation device includes a second displacement mechanism, a second electric drive source, and a second detector. The second displacement mechanism is different from the first displacement mechanism. The second electric drive source is configured to operate the second displacement mechanism. The second detector is configured to detect second positional information indicating the position of the operation member based on the second displacement mechanism. The abnormality determination method includes determining, by the determiner, that the first operation device and the second operation device do not malfunction when the determiner determines that the first operation device has an abnormality based on first operation information related to operation of the first operation device, and that the second operation device has an abnormality based on second operation information related to operation of the second operation device.

A third aspect of the present disclosure relates to a non-transitory storage medium storing instructions that are executable by one or more processors and that cause the one or more processors to perform the following functions. The functions include determining that a first operation device and a second operation device do not malfunction when determination is made that the first operation device has an abnormality based on first operation information related to operation of the first operation device, and that the second operation device has an abnormality based on second operation information related to operation of the second operation device. The first operation device includes a first displacement mechanism, a first electric drive source, and a first detector. The first displacement mechanism is configured to change a position of an operation member to be operated by a driver. The first electric drive source is configured to operate the first displacement mechanism. The first detector is configured to detect first positional information indicating the position of the operation member based on the first displacement mechanism. The second operation device includes a second displacement mechanism, a second electric drive source, and a second detector. The second displacement mechanism is different from the first displacement mechanism. The second electric drive source is configured to operate the second displacement mechanism. The second detector is configured to detect second positional information indicating the position of the operation member based on the second displacement mechanism.

According to the configurations described above, the abnormality that has occurred can appropriately be discriminated based on the information from, for example, the sensors to be used for the operations of the operation members.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A steering system, an abnormality determination method, and a non-transitory storage medium according to an embodiment of the present disclosure are described below with reference to the drawings. Numerical values, shapes, materials, constituent elements, positional relationships and connection statuses of the constituent elements, steps, the order of the steps, and the like described in the following embodiment are examples, and are not intended to limit the present disclosure. Although a plurality of disclosures may be described below as one embodiment, a constituent element that is not described in any claim is described as an optional constituent element regarding the disclosure according to that claim. The drawings are schematic drawings in which objects are emphasized, omitted, or adjusted in terms of their proportions as appropriate to demonstrate the present disclosure. Therefore, shapes, positional relationships, and proportions may differ from actual shapes, positional relationships, and proportions.

Figure 1:
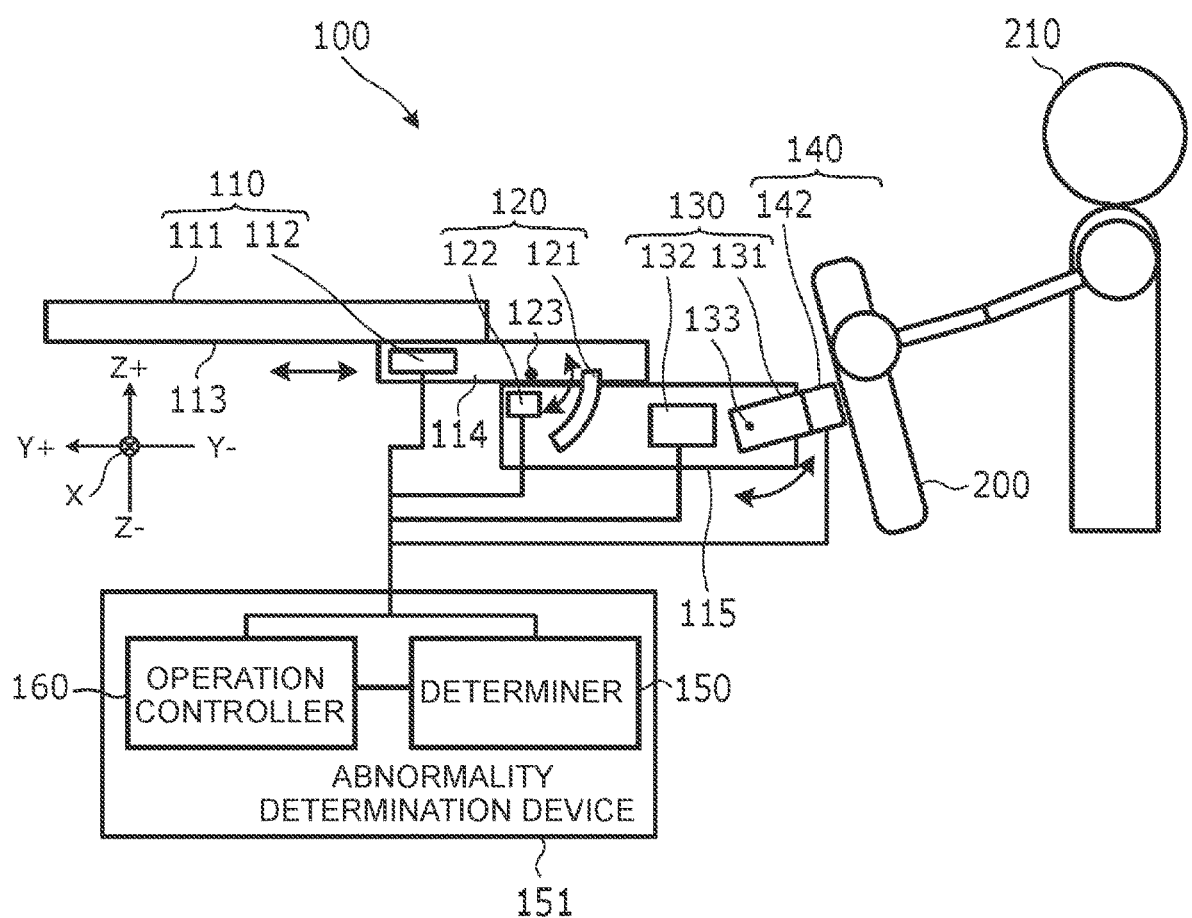
FIG. 1 is a block diagram illustrating the functional configuration of a steering system.

FIG. 1 is a block diagram illustrating the functional configuration of a steering system. A steering system 100 is configured such that an operation member 200 to be used for turning steered wheels of a vehicle including the steering system 100 is movable relative to a driver 210. The steering system 100 includes a first operation device 110, a second operation device 120, and a determiner 150. In this embodiment, the steering system 100 is used as a so-called steer-by-wire (SBW) system in which the operation member 200 is not mechanically connected to the steered wheels of the vehicle and the steered wheels are turned based on a signal indicating an operation amount of the operation member 200. The steering system 100 includes a third operation device 130, a fourth operation device 140, and an operation controller 160. The determiner 150 and the operation controller 160 are implemented by causing an abnormality determination device 151 being a computer to execute programs.

The operation member 200 is operated by the driver 210 to turn the steered wheels of the vehicle including the steering system 100. The shape of the operation member 200 is not particularly limited. In this embodiment, a ring-shaped member called "steering wheel" is employed as the operation member 200, but the operation member 200 may have a rectangular loop shape or a bar shape.

The first operation device 110 changes a position of the operation member 200 to be operated by the driver 210 in one predetermined direction (Y-axis direction in FIG. 1). The first operation device 110 includes a first displacement mechanism 111, a first electric drive source 112, and a first detector (not illustrated).

Figure 2:
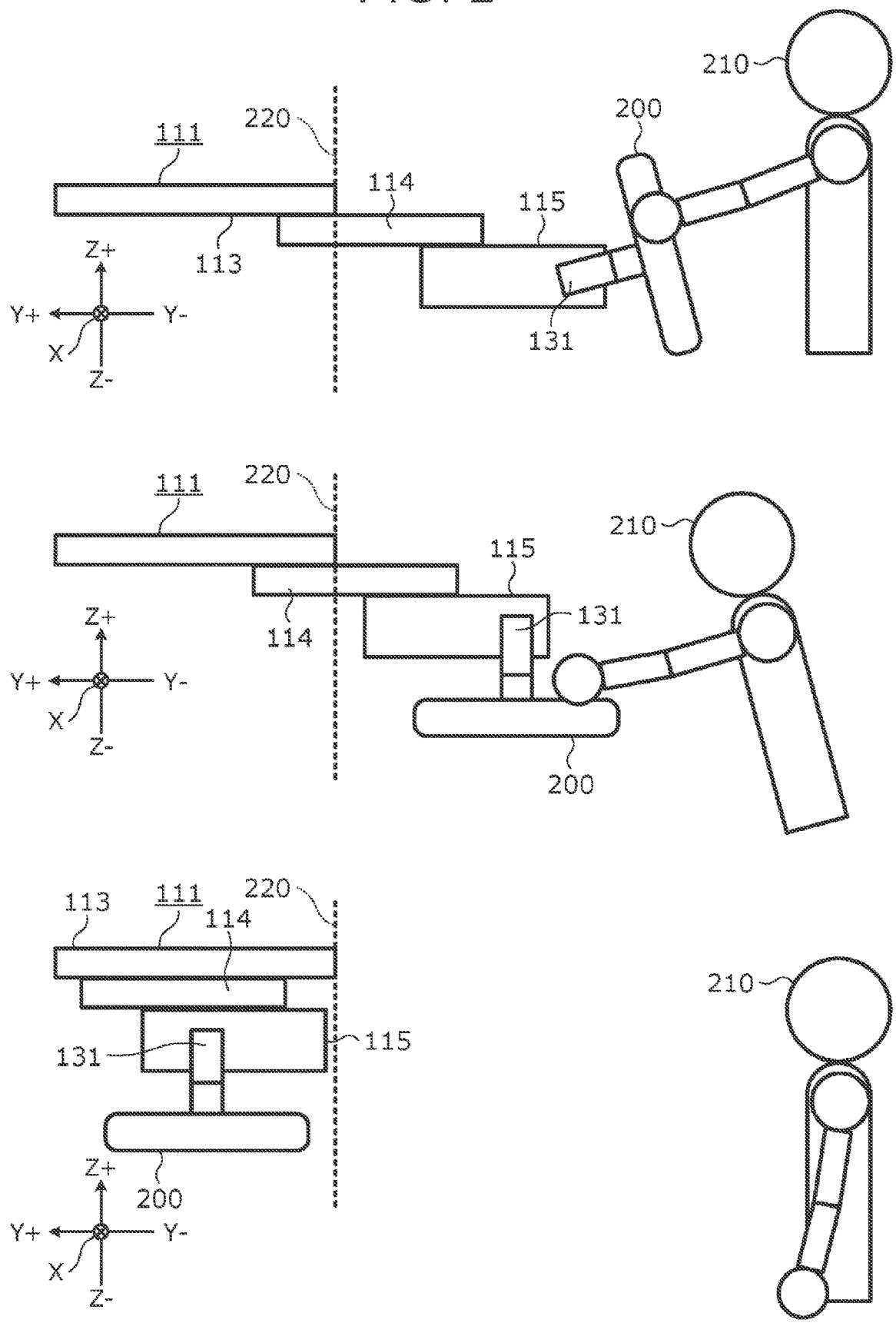
FIG. 2 is a diagram illustrating individual phases of a moving operation member.

The first displacement mechanism 111 is one of mechanisms configured to change the position of the operation member 200 to be operated by the driver 210. In this embodiment, the first displacement mechanism 111 is an advancing and retreating mechanism configured to move the operation member 200 to a front side ("Y+" side in FIG. 1 and FIG. 2) or a rear side ("Y−" side in FIG. 1 and FIG. 2) of the vehicle as illustrated in FIG. 1 and FIG. 2. The first displacement mechanism 111 includes an extensible and contractible mechanism having a plurality of stages. Specifically, the first displacement mechanism 111 includes a base rail 113, an intermediate movable body 114, and a distal movable body 115. The base rail 113 is fixed to the vehicle. The intermediate movable body 114 is guided along the base rail 113 to move in a fore-and-aft direction of the vehicle. The distal movable body 115 is guided along the intermediate movable body 114 to move in the fore-and-aft direction of the vehicle. The first displacement mechanism 111 can advance the operation member 200 toward the driver 210, and retreat the operation member 200 toward a dashboard 220 of the vehicle. The vehicle including the steering system 100 is an autonomous vehicle in which a system can execute overall operations at specific places. As illustrated in the figure below of FIG. 2, the first displacement mechanism 111 can retreat the operation member 200 into the dashboard 220. The first displacement mechanism 111 itself can also contract into the dashboard 220.

The first electric drive source 112 generates a driving force for operating the first displacement mechanism 111. In this embodiment, the first electric drive source 112 is a three-phase brushless motor, which is an electric motor configured to rotate by pulsed electric power supplied from an inverter. The first electric drive source 112 is attached to the intermediate movable body 114. The first electric drive source 112 generates a propulsive force of the intermediate movable body 114 relative to the base rail 113 and a propulsive force of the distal movable body 115 relative to the intermediate movable body 114. The attachment position of the first electric drive source 112 is not particularly limited. A plurality of first electric drive sources 112 may be provided to drive the intermediate movable body 114 and the distal movable body 115 independently.

The first detector detects first positional information indicating a position of the operation member 200 based on the first displacement mechanism 111. The type of the first detector is not particularly limited. In this embodiment, the first detector is a rotation angle detector such as a rotary encoder or a resolver that is provided on the first electric drive source 112 and detects a rotation angle of the first electric drive source 112. The first detector may be a linear encoder or the like attached to the first displacement mechanism 111. If a plurality of first electric drive sources 112 is present, the first detector may acquire positions of the intermediate movable body 114 and the distal movable body 115 and detect those detection results as the first positional information indicating the position of the operation member 200.

The second operation device 120 changes the position of the operation member 200 in a direction different from that of the first operation device 110. The second operation device 120 includes a second displacement mechanism 121, a second electric drive source 122, and a second detector (not illustrated).

The second displacement mechanism 121 changes the position of the operation member 200 in a direction different from that of the first displacement mechanism 111. In this embodiment, the second displacement mechanism 121 is a so-called tilting mechanism configured to move the operation member 200 upward or downward relative to the driver 210 by rotating the distal movable body 115 relative to the intermediate movable body 114 about a first rotational axis 123 extending in a width direction of the vehicle (X-axis direction in FIG. 1 and FIG. 2).

The second electric drive source 122 generates a driving force for operating the second displacement mechanism 121. In this embodiment, the second electric drive source 122 is a three-phase brushless motor. The second electric drive source 122 is attached to the distal movable body 115. The second electric drive source 122 may be attached to the intermediate movable body 114.

The second detector detects second positional information indicating a position of the operation member 200 based on the second displacement mechanism 121. The type of the second detector is not particularly limited. In this embodiment, the type of the second detector is the same as the type of the first detector.

The third operation device 130 changes the position of the operation member 200 in a direction different from those of the first operation device 110 and the second operation device 120. The third operation device 130 includes a third displacement mechanism 131, a third electric drive source 132, and a third detector (not illustrated).

The third displacement mechanism 131 changes the position of the operation member 200 in a direction different from those of the first displacement mechanism 111 and the second displacement mechanism 121. In this embodiment, the third displacement mechanism 131 changes the position of the operation member 200 to a position where the operation member 200 is easily housed in the dashboard 220 by rotating the operation member 200 relative to the distal movable body 115 of the first displacement mechanism 111 about a rotational axis 133 extending in a direction intersecting the rotational direction of the operation member 200, that is, in the width direction of the vehicle (X-axis direction in FIG. 1 and FIG. 2).

The third electric drive source 132 generates a driving force for operating the third displacement mechanism 131. In this embodiment, the third electric drive source 132 is a three-phase brushless motor.

The third detector detects third positional information indicating a position of the operation member 200 based on the third displacement mechanism 131. The type of the third detector is not particularly limited. In this embodiment, the type of the third detector is the same as the type of the first detector.

The fourth operation device 140 changes a position (posture) of the operation member 200 in a direction different from those of the first operation device 110, the second operation device 120, and the third operation device 130. The fourth operation device 140 includes a fourth displacement mechanism (not illustrated), a fourth electric drive source 142, and a fourth detector (not illustrated).

The fourth displacement mechanism includes a rotational shaft and a bearing. The rotational shaft couples the operation member 200 to the fourth electric drive source 142 so that the operation member 200 is rotatable. The bearing retains the rotational shaft so that the rotational shaft is rotatable. Since the operation member 200 has the ring shape, the fourth displacement mechanism changes, as the position of the operation member 200, a posture of the operation member 200, that is, a rotation angle of the operation member 200 about the rotational shaft.

The fourth electric drive source 142 is a so-called reaction motor configured to generate a driving force for rotating the operation member 200 about the rotational shaft. In this embodiment, the fourth electric drive source 142 is a three-phase brushless motor. For example, the fourth electric drive source 142 generates a torque for reproducing a feeling of mechanical steering against an operation torque applied to the operation member 200 by the driver 210. Further, the fourth electric drive source 142 rotates the operation member 200 into a posture suited to housing.

The fourth detector detects fourth positional information indicating a position (posture) of the operation member 200 based on the fourth displacement mechanism. The type of the fourth detector is not particularly limited. The fourth detector may include at least one of a rotation angle detector configured to detect a rotation angle of the fourth electric drive source 142, a rotation angle detector configured to detect a rotation angle of the operation member 200, and a torque sensor configured to detect a torque input to the operation member 200.

The determiner 150 is a processor configured to determine that the first operation device 110 and the second operation device 120 do not malfunction when the determiner 150 determines that the first operation device 110 has an abnormality based on first operation information related to operation of the first operation device 110, and that the second operation device 120 has an abnormality based on second operation information related to operation of the second operation device 120.

The first operation information acquired by the determiner 150 is not particularly limited as long as the information is related to, for example, the operation of the first operation device 110. The first operation information contains at least one of first drive information for operating the first electric drive source 112, and the first positional information acquired from the first detector. For example, the first drive information contains at least one of a first command value for a first inverter configured to supply electric power to the first electric drive source 112, and a first actual electric power value supplied to the first electric drive source 112. For example, the first actual electric power value is represented by using at least one of an actual current value, an actual voltage value, and a duty ratio supplied to the first electric drive source 112.

The second operation information is not particularly limited as long as the information is related to, for example, the operation of the second operation device 120. The second operation information contains at least one of second drive information for operating the second electric drive source 122, and the second positional information acquired from the second detector. For example, the second drive information contains at least one of a second command value for a second inverter configured to supply electric power to the second electric drive source 122, and a second actual electric power value supplied to the second electric drive source 122.

Third operation information and fourth operation information are similar to the second operation information.

Figure 3:
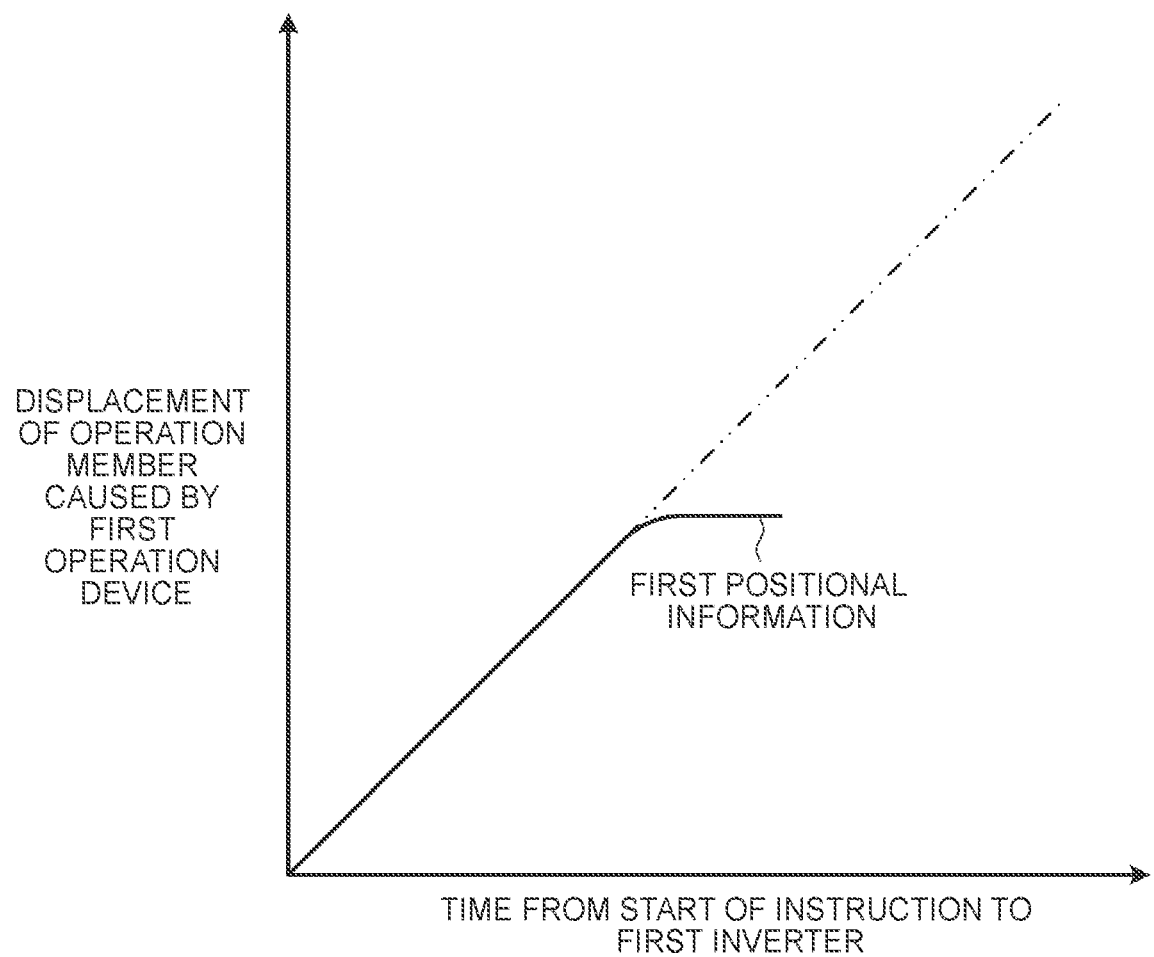
FIG. 3 is a graph illustrating an abnormal operation and a normal operation in combination.

The determination method of the determiner 150 is not particularly limited. For example, the determiner 150 determines that the first operation device 110 has an abnormality when the first positional information indicates an abnormal operation (continuous line in FIG. 3) that is not a predetermined normal operation (long dashed double-short dashed line in FIG. 3). Specifically, the determiner 150 determines that the first operation device 110 has an abnormality when displacement of the operation member indicated by the first positional information falls within a predetermined range including a substantially constant value continuously for a predetermined period.

The determiner 150 may determine that the first detector has an abnormality when the first positional information falls within the predetermined range continuously for the predetermined period and the first drive information contained in the first operation information does not indicate an abnormality. Examples of the case where the first drive information does not indicate an abnormality include a case where the first command value (instructive current value) is supplied to the first inverter configured to supply electric power to the first electric drive source 112 but the first actual electric power value (actual current value) supplied to the first electric drive source 112 does not follow the first command value. Specifically, the determiner 150 acquires a difference between the first command value and the first actual electric power value, and makes determination based on a second threshold. The determiner 150 determines that the first detector has an abnormality when the difference is equal to or larger than the second threshold. As indicated by a dashed line in FIG. 4, the determiner 150 determines that the operation of the first operation device 110 has an abnormality when the difference between the first command value and the first actual electric power value is not equal to or larger than the second threshold and the first actual electric power value increases continuously and exceeds a first threshold set for the first actual electric power value.

The determiner 150 can determine, by similar determination methods, whether an abnormality occurs in the second operation device 120, the third operation device 130, and the fourth operation device 140. In the individual operation devices, the thresholds or the like for determining whether an abnormality occurs differ from each other.

The operation controller 160 is a processor configured to cause at least one of the second operation device 120, the third operation device 130, and the fourth operation device 140 to perform a predetermined operation to make, by the determiner 150, determination as to whether the operation of the first operation device 110 has an abnormality. The second operation device 120, the third operation device 130, and the fourth operation device 140 do not operate in association with the operation of the first operation device 110. For example, the operation controller 160 causes the second operation device 120 to perform, as the predetermined operation, an operation of vibrating with a predetermined stroke while the second operation device 120 is stopped. The operation controller 160 may cause another operation device to operate after an abnormality occurs in the first operation device 110, or may cause, for the abnormality determination, another operation device to operate before an abnormality occurs.

The determiner 150 determines whether the second operation device 120 has an abnormality by acquiring the second operation information of the second operation device 120 that has performed the predetermined operation under the control of the operation controller 160. The operation controller 160 may cause each operation device to perform the predetermined operation when the operation device is in a normal state, and the determiner 150 may acquire and store operation information in the normal state. The determiner 150 may determine whether an abnormality occurs based on the stored operation information in the normal state.

Figure 5:
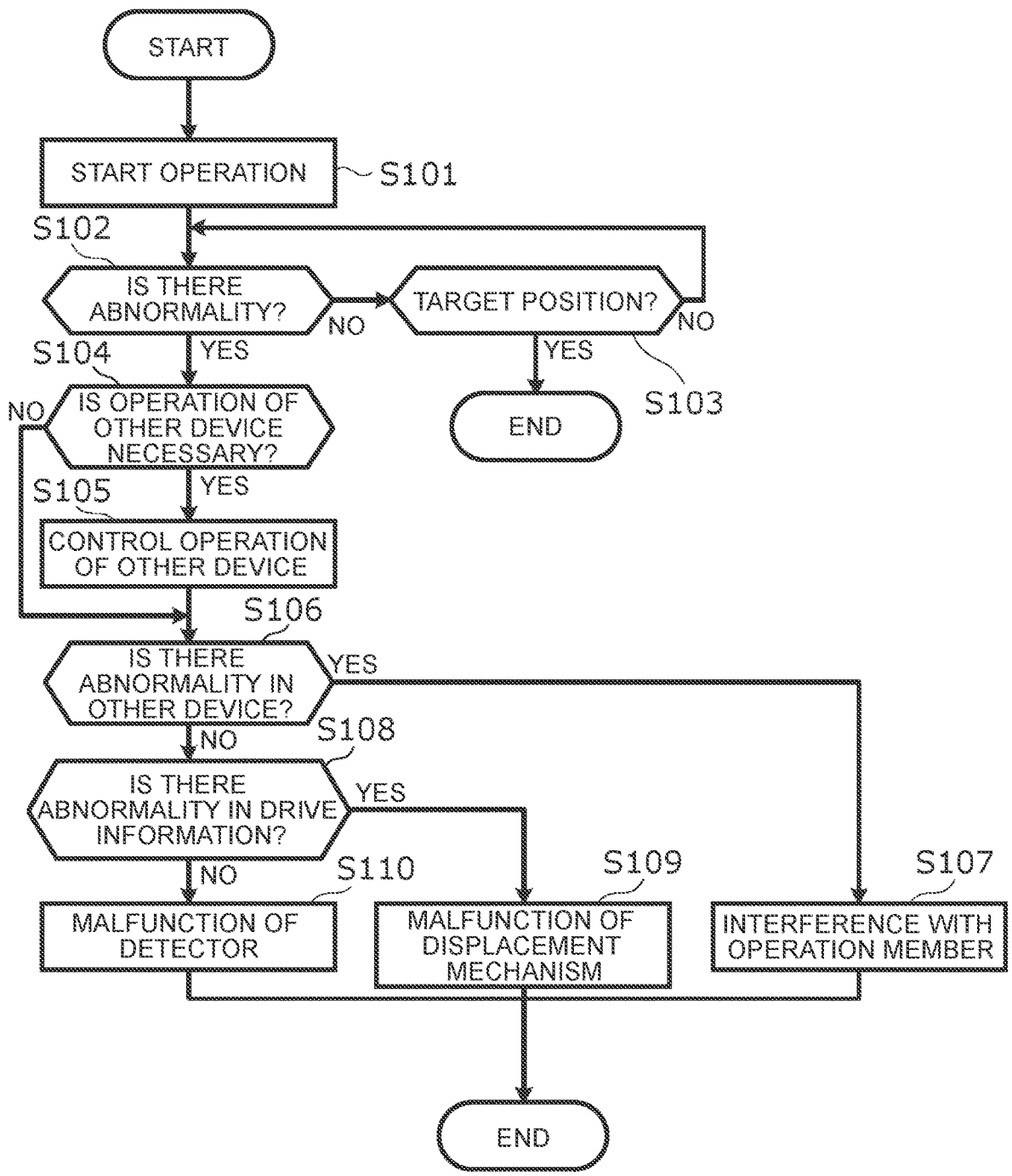
FIG. 5 is a flowchart illustrating a flow of discrimination of an abnormal site in the steering system.

FIG. 5 is a flowchart illustrating a flow of discrimination of an abnormal site in the steering system. In this embodiment, description is given of a case where an abnormal site of the first operation device 110 is discriminated by using the second operation device 120. There is no limitation on the operation device that undergoes the determination and the operation device used for the determination.

The first operation device 110 starts to operate in response to reception of a first operation command for displacing the operation member 200 to a predetermined position (S101). During the operation of the first operation device 110, the determiner 150 determines whether an abnormality occurs by monitoring the first positional information output from the first detector (S102). When the operation member 200 reaches the target position with no abnormality, the process is terminated (S103).

When the determiner 150 determines in Step S102 that the first operation device 110 has an abnormality (S102: Yes), the determiner 150 determines whether the operation of the second operation device 120 that is another device is necessary to acquire the second operation information (S104). When the determiner 150 determines that the second operation device 120 needs to perform the predetermined operation (S104: Yes), the operation controller 160 controls the second operation device 120 to perform the predetermined operation (S105).

The determiner 150 determines whether the second operation device 120 has an abnormality based on the second operation information (S106). When the second operation device 120 has an abnormality (S106: Yes), the determiner 150 determines that the driver 210 or any obstacle interferes with the operation member 200, and reports interference information (S107).

Figure 4:
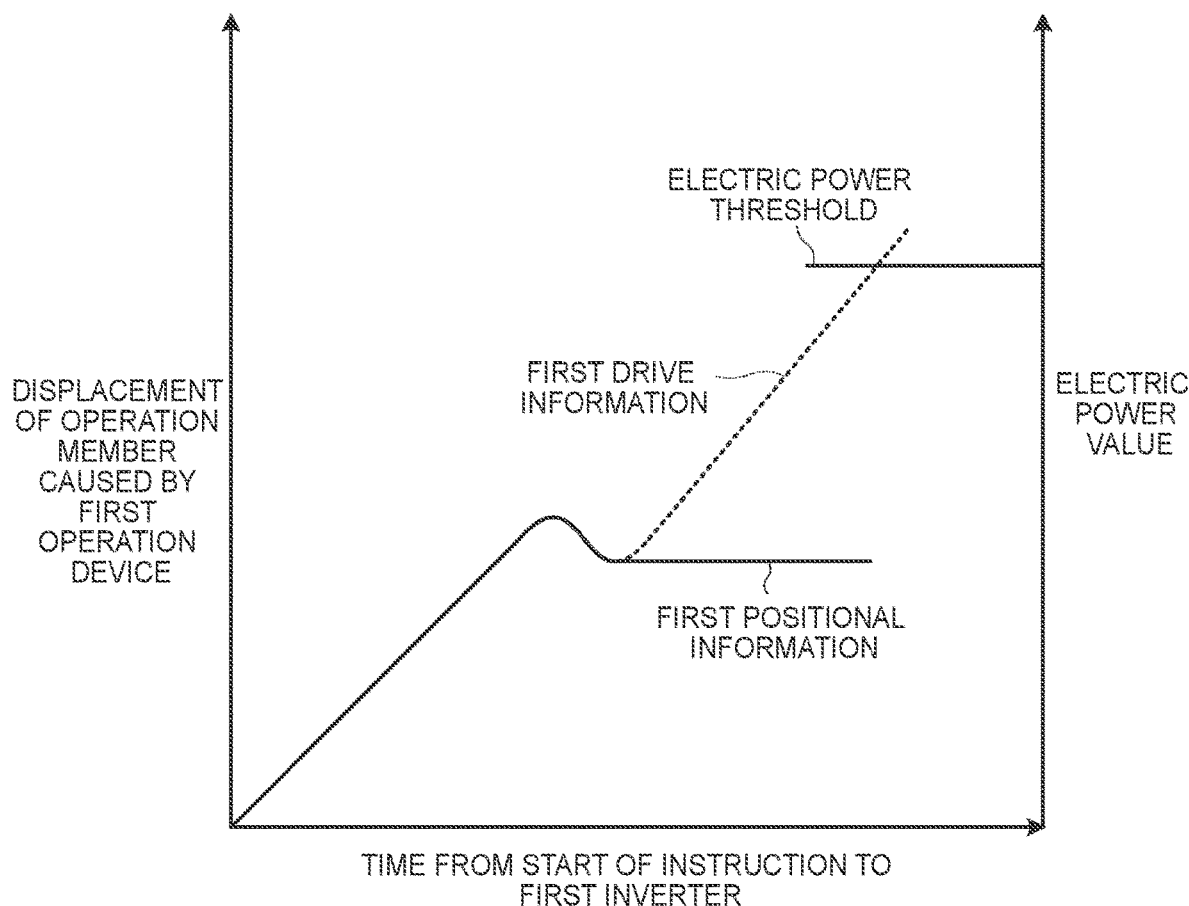
FIG. 4 is a graph illustrating a state in which determination is made that a displacement mechanism has an abnormality.

The determiner 150 further determines whether the first displacement mechanism 111 has an abnormality based on the first drive information (S108). For example, the possibility of interference with the operation member 200 is excluded in Step S106 when the first drive information for operating the first electric drive source 112 in the first operation information exceeds an electric power threshold as illustrated in FIG. 4, specifically, when the actual current value contained in the first drive information exceeds a current threshold. Therefore, the determiner 150 determines that the first displacement mechanism 111 has an abnormality due to the occurrence of malfunction (S108: Yes). Examples of the malfunction of the first displacement mechanism 111 include a state in which the first displacement mechanism 111 fails to operate because a foreign object is caught between meshing gears of the first displacement mechanism 111 or between a screw shaft and a nut. The determiner 150 reports malfunction information on the first displacement mechanism 111 as a determination result (S109).

When the determiner 150 determines that the first displacement mechanism 111 does not malfunction (S108: No), the determiner 150 reports malfunction information on the first detector (S110). The determiner 150 may determine that the first detector malfunctions when a difference between the instructive current value and the actual current value contained in the first drive information is equal to or larger than the second threshold.

In the steering system 100 according to this embodiment, the abnormality determination device 151 acquires the positional information and the drive information to be used for displacing the operation member 200 to the specified position, and the determiner 150 makes determination. Thus, the abnormality caused by an external force input to the operation member 200, the abnormality caused by the malfunction of the displacement mechanism, and the abnormality caused by the malfunction of the detector can be discriminated without using, for example, a detector to be used only for discriminating the abnormal site.

When the information for discriminating the malfunctioning site is insufficient, an operation device other than the operation device whose abnormality is detected is caused to operate by the operation controller 160. Thus, the determiner 150 can acquire necessary information.

The present disclosure is not limited to the embodiment described above. For example, the embodiment of the present disclosure may be other embodiments implemented by arbitrarily combining the constituent elements described herein or by omitting some of the constituent elements. The present disclosure encompasses modified examples obtained by various modifying the embodiment as conceived by persons having ordinary skill in the art without departing from the spirit of the present disclosure, that is, meanings of description of the claims.

For example, the steering system 100 may be used, instead of the steer-by-wire system, as a steering system in which the steered wheels are mechanically connected to the operation member 200. For example, the steering system 100 may be configured to change the position of the operation member 200 by using a driving force of an electric motor depending on the size of the driver 210.

Description is given of the case where the operation member 200 is housed by being rotated about the rotational axis extending in the width direction of the vehicle and intersecting the moving direction. However, there is no limitation on how the operation member 200 is housed. For example, the operation member 200 may be embedded in the dashboard 220 without the fourth operation device 140 while keeping the posture of the operation member 200.

Figure 6:
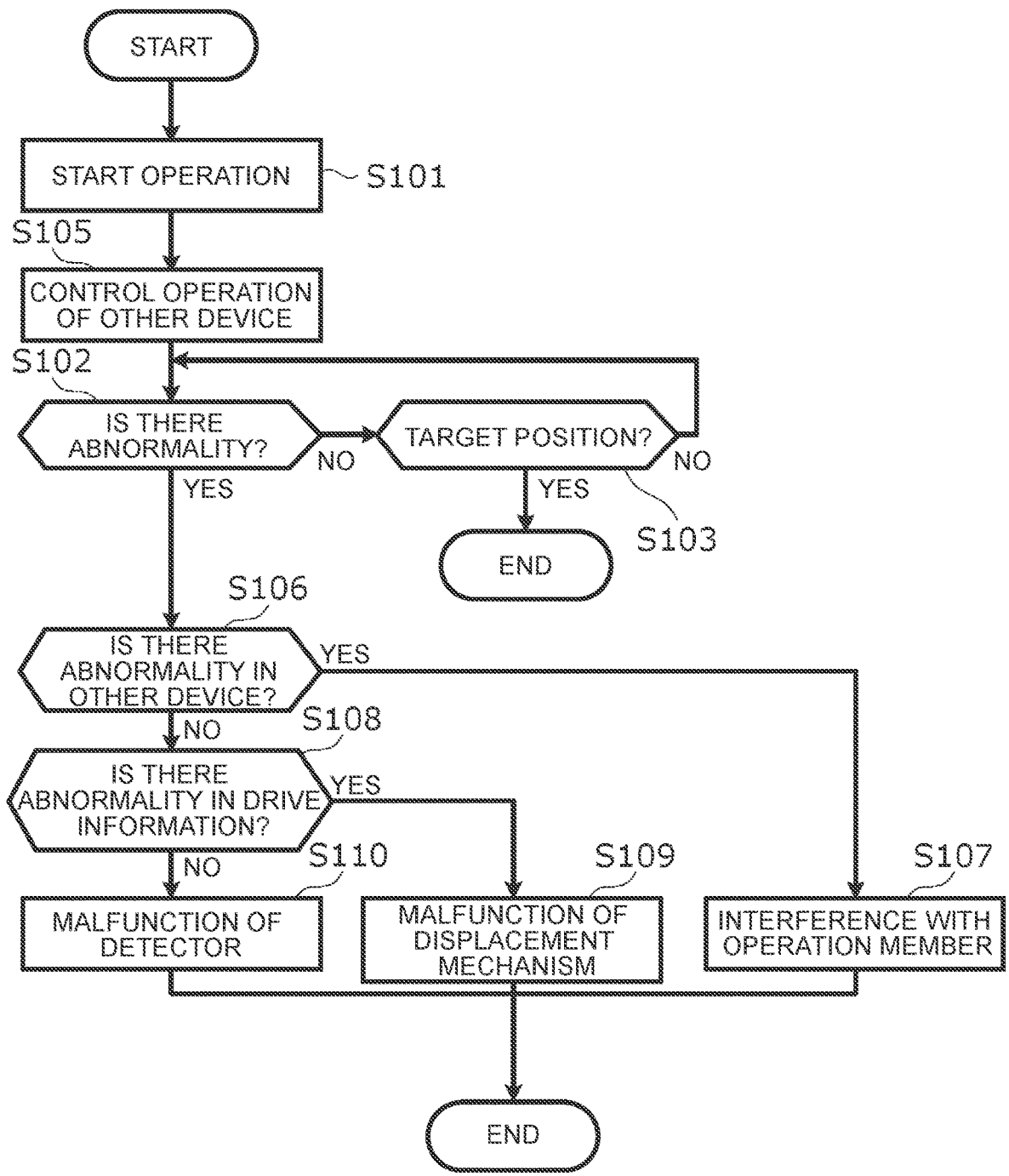
FIG. 6 is a flowchart illustrating a first other procedure of the flow of discrimination of the abnormal site in the steering system.

As illustrated in FIG. 6, the operation controller 160 may cause the second operation device 120 to operate in advance to discriminate the abnormality of the first operation device 110. The same processes (steps) as those of FIG. 5 may be represented by the same reference symbols to omit description.

The first operation device 110 starts to operate in response to the first operation command (S101). In response to the operation of the first operation device 110, the operation controller 160 controls the second operation device 120 to perform the predetermined operation (S105).

During the operation of the first operation device 110, the determiner 150 determines whether an abnormality occurs by monitoring the first positional information output from the first detector (S102). When the operation member 200 reaches the target position with no abnormality, the process is terminated (S103).

When the determiner 150 determines in Step S102 that the first operation device 110 has an abnormality (S102: Yes), the determiner 150 determines whether the second operation device 120 has an abnormality based on the second operation information (S106).

Figure 7:
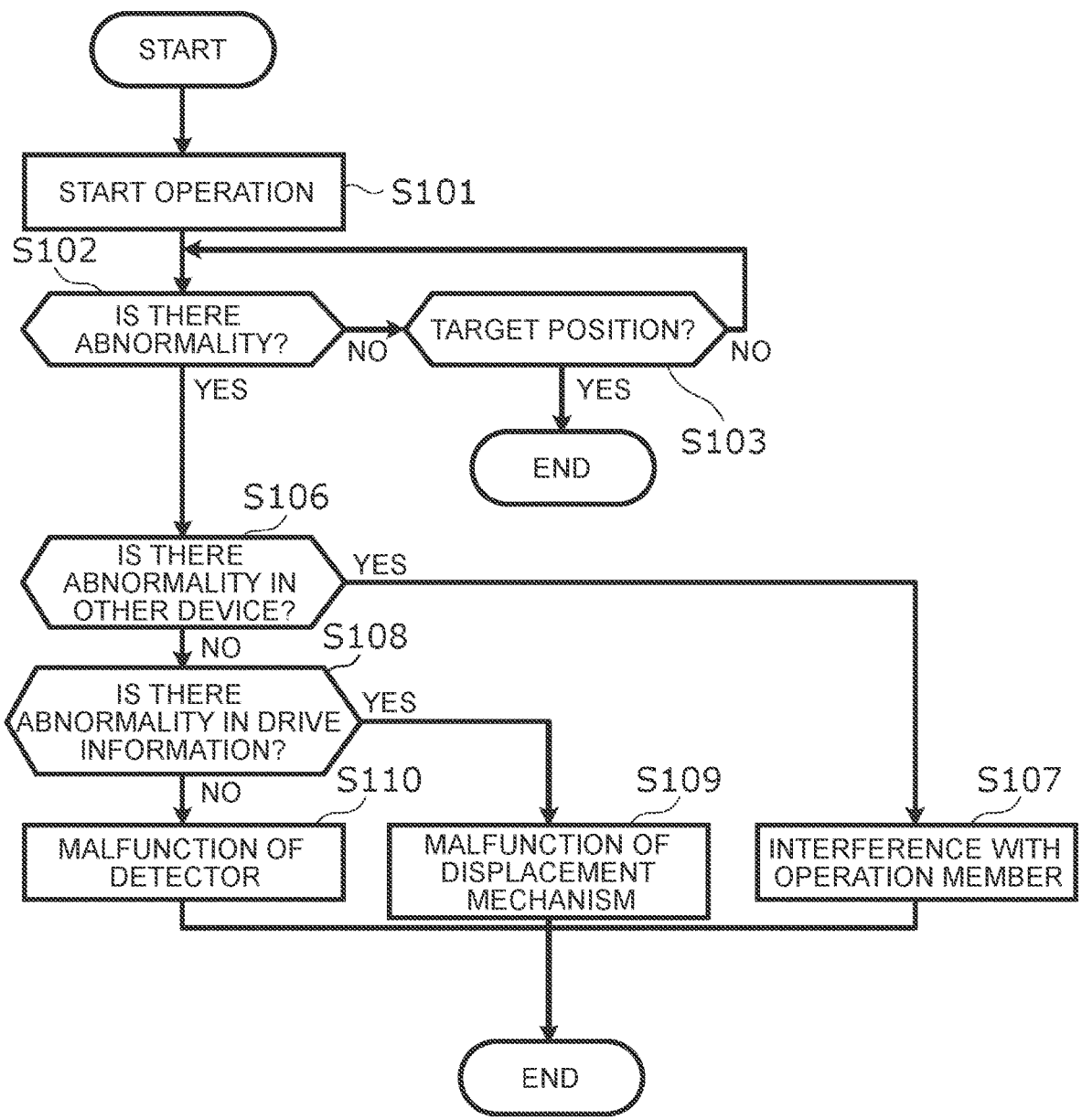
FIG. 7 is a flowchart illustrating a second other procedure of the flow of discrimination of the abnormal site in the steering system.

In a case where the second operation device 120 operates in association with the first operation device 110, the abnormal site may be discriminated based on, for example, whether the second operation device 120 has an abnormality without executing the control step of the operation controller 160 (S105) as illustrated in FIG. 7.

The present disclosure is applicable to a steering system configured to electrically change a position of an operation member.

What is claimed is:

1. A steering system comprising:
    a first operation device including
        a first displacement mechanism configured to change a position of an operation member to be operated by a driver,
        a first electric drive source configured to operate the first displacement mechanism, and
        a first detector configured to detect first positional information indicating the position of the operation member based on the first displacement mechanism;
    a second operation device including
        a second displacement mechanism different from the first displacement mechanism,
        a second electric drive source configured to operate the second displacement mechanism, and
        a second detector configured to detect second positional information indicating the position of the operation member based on the second displacement mechanism; and
    a determiner configured to determine that the first operation device and the second operation device do not malfunction when the determiner determines that the first operation device has an abnormality based on first operation information related to operation of the first operation device, and that the second operation device has an abnormality based on second operation information related to operation of the second operation device.

2. The steering system according to claim 1, wherein:
    the first displacement mechanism is an advancing and retreating mechanism configured to advance or retreat the operation member relative to the driver; and
    the second displacement mechanism is a tilting mechanism configured to move the operation member upward and downward.

3. The steering system according to claim 1, wherein the determiner is configured to determine that the first operation device has the abnormality when the first positional information contained in the first operation information indicates an abnormal operation that is not a predetermined normal operation.

4. The steering system according to claim 1, wherein the determiner is configured to determine that the first detector has an abnormality when the first positional information falls within a predetermined range continuously for a predetermined period and first drive information for operating the first electric drive source in the first operation information does not indicate an abnormality.

5. The steering system according to claim 4, wherein the determiner is configured to determine that the first detector malfunctions when a difference between an instructive current value and an actual current value contained in the first drive information is equal to or larger than a second threshold.

6. The steering system according to claim 1, wherein the determiner is configured to determine that the first displacement mechanism malfunctions when first drive information for operating the first electric drive source in the first operation information exceeds an electric power threshold.

7. The steering system according to claim 1, wherein the determiner is configured to determine that the operation of the first operation device has an abnormality when first drive information for operating the first electric drive source in the first operation information exceeds a first threshold.

8. The steering system according to claim 1, further comprising an operation controller configured to cause the second operation device to perform a predetermined operation to make, by the determiner, determination as to whether the operation of the first operation device has an abnormality.

9. An abnormality determination method for a steering system, the steering system including:
   a first operation device including
      a first displacement mechanism configured to change a position of an operation member to be operated by a driver,
      a first electric drive source configured to operate the first displacement mechanism, and
      a first detector configured to detect first positional information indicating the position of the operation member based on the first displacement mechanism;
   a second operation device including
      a second displacement mechanism different from the first displacement mechanism,
      a second electric drive source configured to operate the second displacement mechanism, and
      a second detector configured to detect second positional information indicating the position of the operation member based on the second displacement mechanism; and
   a determiner,
   the abnormality determination method comprising determining, by the determiner, that the first operation device and the second operation device do not malfunction when the determiner determines that the first operation device has an abnormality based on first operation information related to operation of the first operation device, and that the second operation device has an abnormality based on second operation information related to operation of the second operation device.

10. The abnormality determination method according to claim 9, further comprising causing, by an operation controller, the second operation device to perform a predetermined operation when the determiner determines that the operation of the first operation device has an abnormality.

11. A non-transitory storage medium storing instructions that are executable by one or more processors and that cause the one or more processors to perform functions comprising determining that a first operation device and a second operation device do not malfunction when determination is made that the first operation device has an abnormality based on first operation information related to operation of the first operation device, and that the second operation device has an abnormality based on second operation information related to operation of the second operation device,
   the first operation device including:
      a first displacement mechanism configured to change a position of an operation member to be operated by a driver;
      a first electric drive source configured to operate the first displacement mechanism; and
      a first detector configured to detect first positional information indicating the position of the operation member based on the first displacement mechanism,
   the second operation device including:
      a second displacement mechanism different from the first displacement mechanism;
      a second electric drive source configured to operate the second displacement mechanism; and
      a second detector configured to detect second positional information indicating the position of the operation member based on the second displacement mechanism.

* * * * *